United States Patent [19]

Thompson

[11] 4,249,717
[45] Feb. 10, 1981

[54] SEAL FOR A LIQUID VALVE
[75] Inventor: William S. Thompson, Elkhart, Ind.
[73] Assignee: Elkhart Brass Manufacturing Co., Inc., Elkhart, Ind.
[21] Appl. No.: 85,697
[22] Filed: Oct. 17, 1979
[51] Int. Cl.³ .............................................. F16K 25/00
[52] U.S. Cl. ..................................... 251/210; 251/333
[58] Field of Search ............................... 251/333, 210
[56] References Cited
U.S. PATENT DOCUMENTS

| 2,124,155 | 7/1938 | Thaete | 251/333 X |
| 3,168,283 | 2/1965 | Gamble | 251/333 |

FOREIGN PATENT DOCUMENTS 390695  4/1933  United Kingdom ..................... 251/210

Primary Examiner—Arnold Rosenthal
Attorney, Agent, or Firm—Oltsch, Knoblock & Hall

[57] ABSTRACT

A valve including a resilient seal which contacts in a sealing relationship an annular valve seat having an offset annular surface area at the valve inlet against which the resilient seal of the valve is compressed by an overlying rigid member to reduce the liquid pressure against the valve seal, thereby easing the effort to close the valve.

4 Claims, 4 Drawing Figures

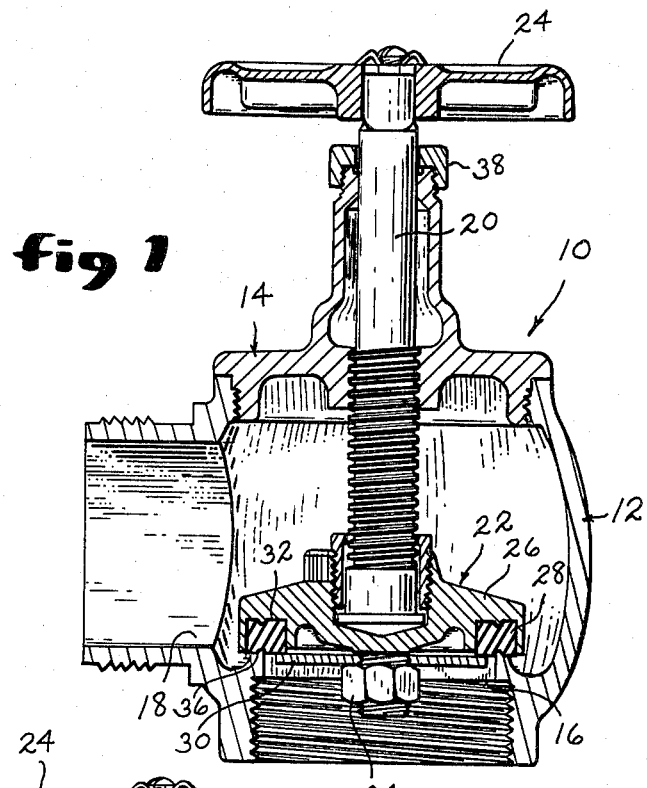
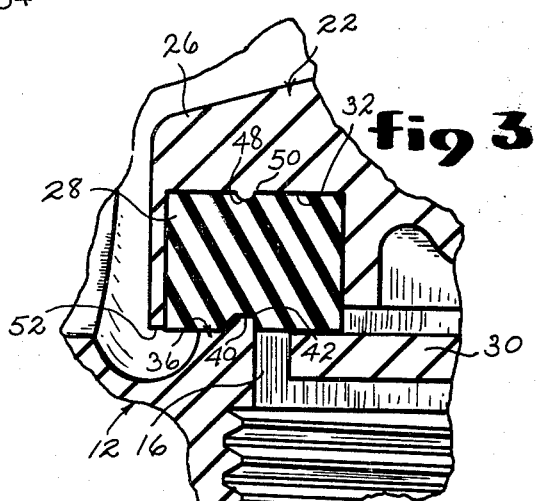
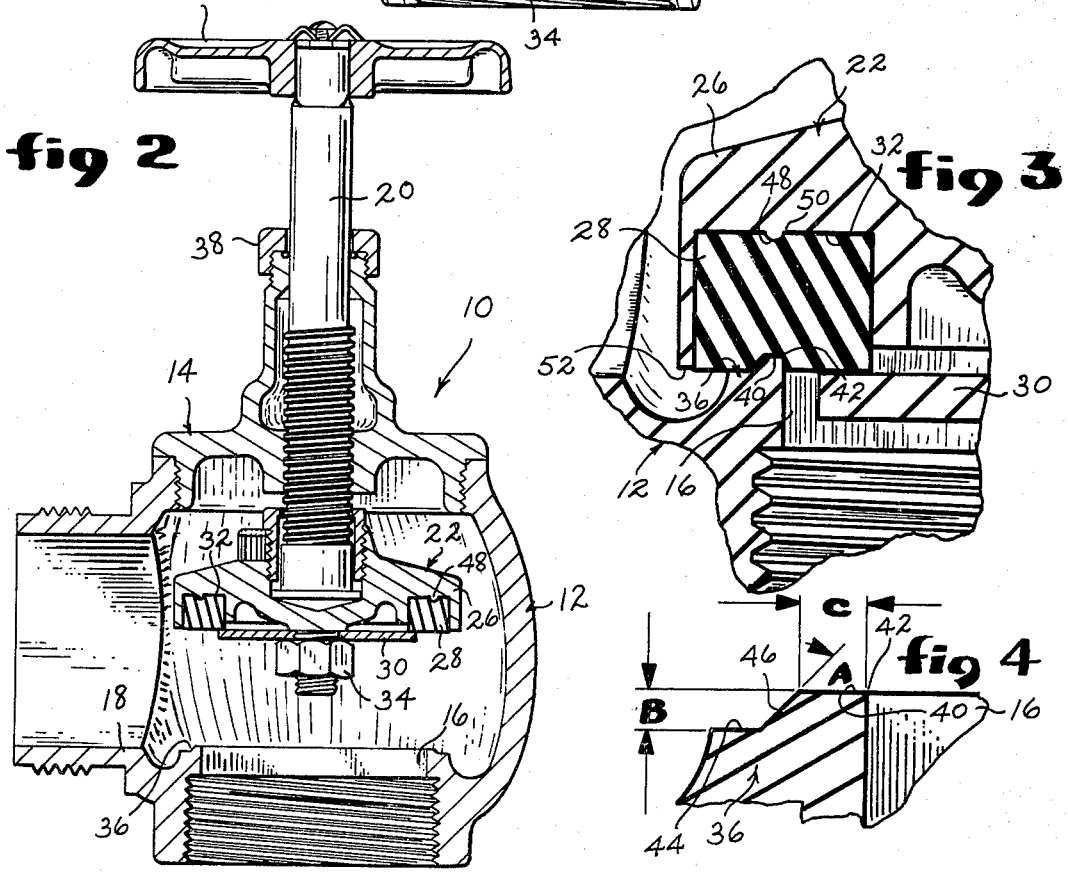
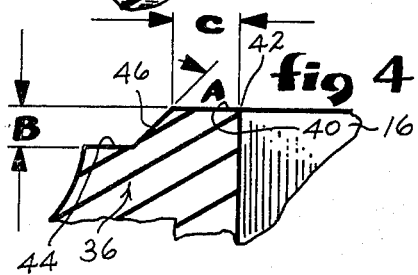

SEAL FOR A LIQUID VALVE

SUMMARY OF THE INVENTION

This invention relates to a liquid valve and will have specific but not limited application to an angle fire valve having a cooperating valve seat and shiftable seal which reduces the amount of effort required to close the valve when the inlet thereof is subjected to high liquid pressures.

In the valve of this invention, the valve seat is of a two step annular form having a reduced annular flat seal area at the valve inlet. The resilient seal of the valve is carried by a shiftable valve member which includes an annular protrusion or rib located in alignment with the valve seat at its reduced flat seal area adjacent the valve inlet to cause the resilient seal of the valve to be compressed between the rib of the valve member and the valve seat at its inlet. This reduces the effective area of liquid pressure between the valve seat and the valve seal during the sealing operation so as to minimize the torque or effort required to close the valve. When such valves are utilized as fire valves, the water pressure at the inlet of the valve may be in the range of 300 pounds per square inch. Under these circumstances, without the assistance of this invention, it is difficult to close such valves.

Accordingly, it is an object of this invention to provide a liquid valve which requires a minimal amount of effort to close when subjected to high inlet pressures.

Another object of this invention is to provide a liquid valve having a valve seat and a shiftable cooperating valve seal which is constructed to reduce upon closure of the valve the effective diameter of the valve at the inlet to reduce the torque required to close the valve.

Another object of this invention is to provide a fire valve which can be closed with minimal effort when subjected at its inlet to pressures in excess of 200 psi.

Other objects of this invention will become apparent upon a reading of the following description.

BRIEF DESCRIPTION OF THE DRAWINGS

A preferred embodiment of this invention has been chosen for purposes of illustration and description wherein:

FIG. 1 is a sectionalized view of the valve shown in its closed position.

FIG. 2 is a sectionalized view of the valve shown in its open position.

FIG. 3 is an enlarged detailed view of a fragmentary portion of the valve at its valve seat and shown in its closed position.

FIG. 4 is an enlarged detailed view of the valve seat shown in fragmentary sectionalized form.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Valve 10 shown in the figures is of the angle valve type utilized to accommodate liquid flow. Valve 10 includes a housing having a body 12 and a bonnet 14. Body 12 includes an inlet 16 and an outlet 18. A stem 20 is carried in cooperative threaded engagement by bonnet 14 so as to be shiftable longitudinally relative to bonnet 14 and valve body 12 upon rotation of the stem. A valve member, designated generally by the reference numeral 22, is carried at the inner part of stem 20 and a handle or similar gripping device 24 is carried at the projecting outer part of the stem. Valve member 22 includes a disk part 26, a resilient annular seal 28 and a seal securement member 30. Seal 28 is carried within an annular groove 32 in disk part 26 so as to be locatable between the side walls and in abutment with the base wall of the groove. Securement member 30 overlies an annular edge section of seal 28 and is urged against the seal by a retainer nut 34. In this manner, seal 28 is retained within groove 32 of disk part 26. Disk part 26 is journaled upon stem 20 so as to permit the stem to rotate relative to the disk part when seal 28 is brought into sealing engagement with valve seat 36 of valve body 12. Valve member 22 is shiftable between the closed position shown in FIG. 1 with seal 28 engaging valve seat 36 and an open position, such as shown in FIG. 2, upon rotation of stem 20. Nut 38 which encloses stem 20 and is threaded onto bonnet 14 serves to provide a packing seal for the valve at the stem.

Valve 10 as thus far above described is of a standard, well known construction. In this invention the cooperative relationship between seal 28 and valve seat 36 is of a unique modified construction which enables the effective diameter of the valve member at closing to be reduced so as to reduce the closing effort or torque applied to stem 20. Valve seat 36 is of a two-step construction and includes an annular planar area or section 40 which terminates at end edge 42 of valve inlet 16 and an annular planar area or section 44 spaced radially outwardly of section 40. Section 44 of valve seat 36 is offset downstream relative to inlet 16 from section 40 with a conical area or section 46 of the valve member separating sections 40 and 44.

In valves of the nature herein illustrated having a 2½ inch diameter inlet 16, the width of valve seat section 40 indicated by dimension "C" in FIG. 4 is preferably 0.08 inches, with the offset between sections 40 and 44 as indicated by dimension "B" in FIG. 4 being preferably 0.05 inches and with the taper of conical section 46 relative to section 40 indicated by angle "A" in FIG. 4 being preferably 45°. Also, as best shown in FIG. 4, edge 42 of inlet 16 is abrupt or sharp cornered. Sections 40 and 44 of the valve seat parallel one another and extend at a right angle to inlet 16 of the valve.

An annular rib 48 protrudes from the base wall of groove 32 in disk part 26. Rib 48 is located within disk part groove 32 so as to be positioned over valve seat section 40 and preferably aligned at its interior edge 50 with edge 42 of valve inlet 16. For a disk part 26 having its groove base wall spaced 0.44 inches from end edge 52 of the disk part, rib 48 is preferably formed about a 1/32 inch radius with a maximum height of 0.065 inches.

As stem 20 is rotated and valve member 22 is shifted into its closed position shown in FIG. 1, seal member 28 will first contact valve seat 36 at its section 40 causing the seal to be compressed between section 40 and rib 48 of disk part 26. Further closing movement of valve member 22 upon continued rotation of stem 20 causes seal 28 to first make contact with conical section 46 and thereafter planar section 44 of valve seat 36. This cooperation between disk part rib 48 and stepped valve seat sections 40 and 44 upon compression of seal member 28 during closing movement of the valve member causes a reduction in the effective diameter of the valve member to reduce the amount of twisting effort or torque applied to stem 20 in closing the valve.

It is to be understood that the invention is not to be limited to the details above given but may be modified within the scope of the appended claims.

What I claim is:

1. In a valve including a housing having an inlet and an outlet and a valve seat, a stem shiftably carried by said housing and including an inner part which projects into the housing and which mounts a valve member and an axially shiftable outer projecting part which mounts a hand grip, said valve member being shiftable toward and away from said valve seat to regulate liquid flow through said valve outlet as said outer stem part is axially shifted, said valve member having a closed position in contact with said valve seat, said valve seat including an annular sealing surface having an inner circumferential end edge defining said valve inlet, said valve member including a disk part having an annular groove formed therein, said groove defined by spaced side walls and a base wall located in an opposed relationship with said valve seat sealing surface as said valve member is shiftable toward and away from said valve seat, a resilient annular seal member carried within said disk part groove, the improvement wherein said valve seat sealing surface includes a first annular planar section and a second annular planar section radially outset and offset downstream from said first planar section and separated therefrom by a conical section, said first planar section terminating at said inlet inner end edge, said groove base wall carrying an annular rib located between the side walls thereof and positionable over said first planar section of the valve seat sealing surface as said valve member is shifted into its closed position with said seal member being resiliently compressed between said rib and said first planar section.

2. The valve of claim 1 wherein said first and second annular planar sections are parallel and extend at a general right angle relative to said valve inlet.

3. The valve of claim 2 wherein said rib is aligned with said valve inlet inner end edge.

4. The valve of claim 1 wherein said rib is aligned with said valve inlet inner end edge.

* * * * *